Figure 1:
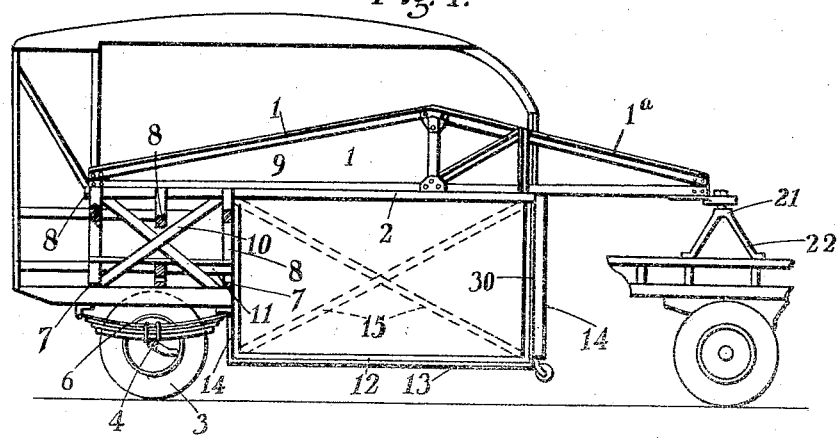

Feb. 7, 1933.  S. F. MOTT  1,896,717
TRAILER
Filed Jan. 7, 1930  3 Sheets-Sheet 1

INVENTOR
S. F. MOTT
BY
ATTORNEY

Feb. 7, 1933.  S. F. MOTT  1,896,717
TRAILER
Filed Jan. 7, 1930  3 Sheets-Sheet 3
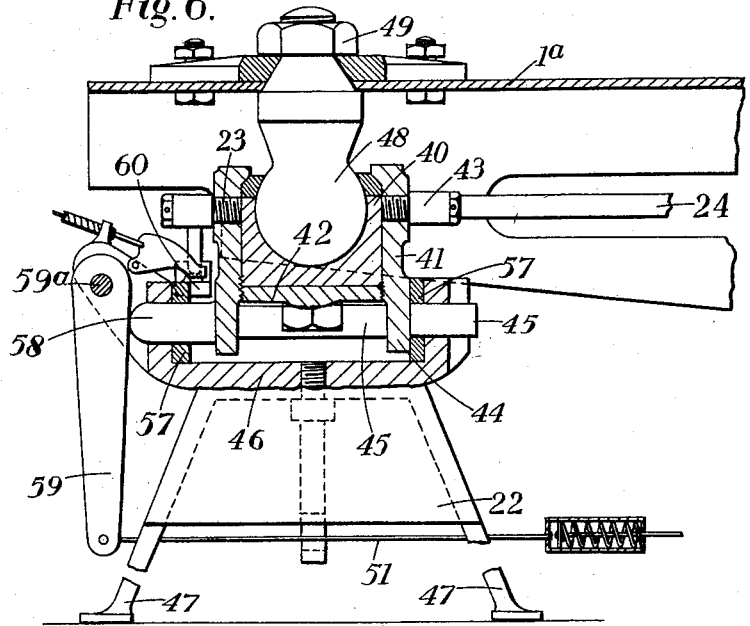
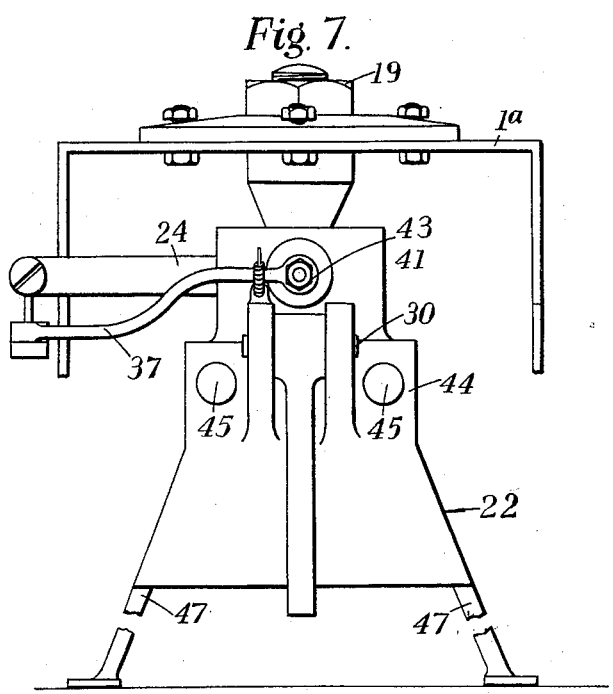
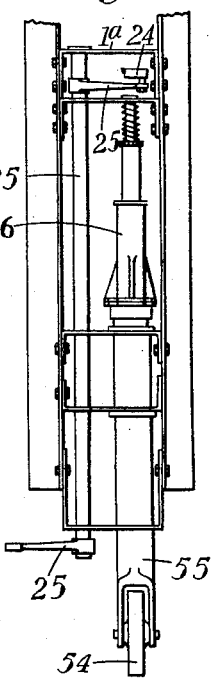
INVENTOR
S. F. MOTT
BY
ATTORNEY Patented Feb. 7, 1933

1,896,717

UNITED STATES PATENT OFFICE

STANLEY FIELDER MOTT, OF LEAMINGTON-HASTINGS, NEAR RUGBY, ENGLAND

TRAILER

Application filed January 7, 1930, Serial No. 419,132, and in Great Britain January 11, 1929.

This invention relates to trailers and more particularly to horse and livestock boxes in the form of trailers adapted to be coupled to motor vehicles.

The principal object of the invention is to provide for comparatively cheap and convenient trailer horse boxes, but certain features are applicable to trailers other than those forming horse boxes.

The invention comprises the novel features, combinations and arrangements embodied in the preferred forms it is now proposed to describe in order to render the nature of the invention clear.

In particular the invention has for an object to provide a two-wheeled trailer provided with steerable wheels and steering mechanism operated according to the angle between the main chassis and the trailer to steer the trailer wheels. Another feature lies in trailer brake mechanism as hereinafter described.

It is a further object to make the vehicle to which the trailer is adapted and trailer in accordance with this invention form, when they are coupled together, a unitary vehicle whereof the steering of the back wheels is dependent on the angular relationship between the coupled frames or chassis: thus from one aspect of the invention it may be said to comprise a jointed six-wheeled vehicle whereof the rear wheels are directed to follow within the track of the front two pairs by mechanism operated with the changing angular relationship between the frame.

A further object is to provide a trailer which comprises a central longitudinal framing with respect to which a central draw-bar is rigidly secured, a transverse framework at the rear carrying an axle and a pair of wheels and a body suspended from the chassis thus formed.

In its preferred form the central framing is of the nature of a lattice girder or beam and as applied to a horse box forms part of a longitudinal partition between two horses which may enter the body from the sides and stand one on each side of the framing.

One such form is more particularly intended for attachment to a lorry or commercial vehicle where such is available, as is often the case for general purposes at a country house, farm or estate. In this form, the trailer is provided with a pair of rear wheels, and has a central chassis frame arranged to be coupled at a point immediately above the centre of the back axle of the lorry or like, or at a convenient point closely adjacent thereto and preferably forwardly thereof. This frame may lie at a sufficiently high level to be clear of the differential, and may be attached by means of a ball and socket or equivalent joint giving freedom of movement.

Referring now to the accompanying drawings:—

Figure 2:
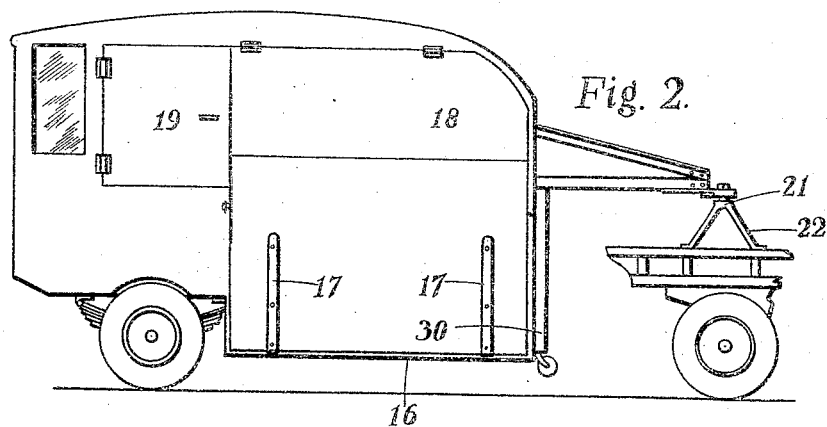
Figure 3:
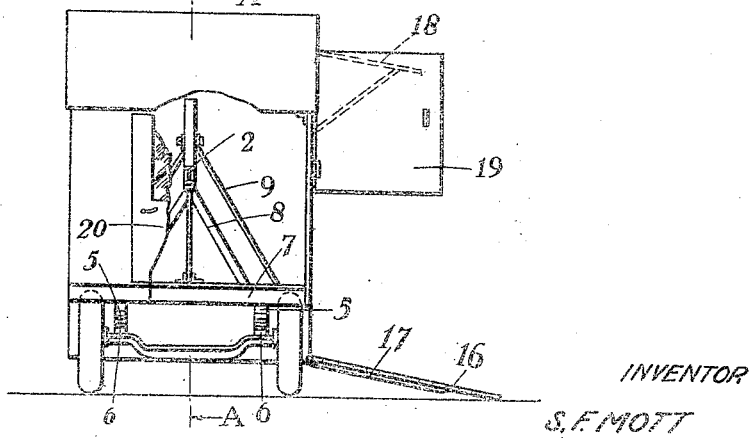
Figure 4:
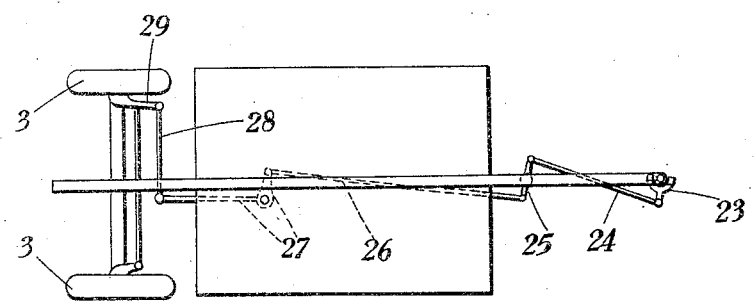
Figure 5:
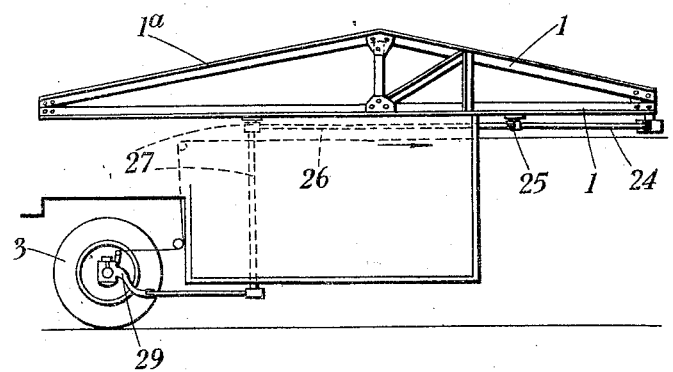

Figure 1 is a sectional side elevation in line A, A of Figure 3;
Figure 2 is a side elevation;
Figure 3 is a rear view, partly in section;
Figure 4 is a diagrammatic plan showing steering connections;
Figure 5 is a similar elevation.
Figure 6 is a sectional side elevation to an enlarged scale of the coupling as applied to a trailer vehicle with a somewhat different form of rigid drawbar,
Figure 7 a front elevation of the same, and
Figure 8 a view to the same enlarged scale looking towards the front end of the trailer.

As illustrated the invention is applied to a trailer horse box adapted for the transport of two horses. A main longitudinal frame is centrally disposed and consists of a built-up girder 1 having an extending portion 1a which forms a draw-bar. A longitudinal member 2 is attached to the lower flange of the girder 1. The rear end of the girder is supported by the rear wheels 3 and axle 4 by a transverse framing. This framing includes a pair of longitudinal members 5 attached to the springs 6. The members 5 support two lateral members 7 extending the full width of the body and one sufficiently shorter to clear the wheels. These lateral members are in turn connected by inclined stays 8 to the member 2. Ties 9 may also be employed to help in giving sufficient lateral rigidity, and cross-braces 10 help to stiffen the framing and body longitudinally. The wheels are enclosed by partitions 11 which also form the bottoms of a pair of mangers one on each side of the vehicle.

From the framing thus constituted the floor 12 of the vehicle including light metal beams 13 is suspended by hangers 14. The frame of the roof and upper part of the body are of light wooden construction attached at the sides, back and front of the parts already described, the front being sufficiently braced relatively to the main girder 1. The central framework may be carried down to floor level, or near floor level as indicated by the dotted parts 15 where a partition is required between two horses, or these parts may be omitted, particularly where a clear floor-space is desired. The upper portion and roof of the body may also be omitted—for example, in the construction of a truck for cattle or other livestock or goods.

The arrangement of the side ramps and openings can be clearly seen at Figures 2 and 3. The ramps 16 are stiffened by metal supporting pieces 17 and are hinged to the metal girders 13 at the sides of the body.

Upper flaps 18 are hinged at the top, and side flaps 19 at the rear, permitting the horses to be boxed and unboxed from the sides of the vehicle as in ordinary railway horse boxes. The rearward portions of the members 5 carry an extension which may be used as a goods locker or in which stable boys may travel close to the horses' heads. Access is provided by a rear door 20.

The wheels 3 are steerable, the central framing giving a convenient means for carrying the steering connections and brake cable. The ball or like universal joint generally designated 21 is carried by a spider 22 on the drawing lorry and includes relatively longitudinally movable parts for applying the brake. The forward end of the frame 1 is attached to the upper member of the universal joint. The forked steering arm 37 thus moves in accordance with the angle between the drawing vehicle and the trailer and moves the wheels through link 24, lever 25, link 26, bell-crank 27, link 28, and steering arm 29.

A front supporting wheel and adjusting jack may be permanently secured upon the trailer as indicated at 30 and detailed at Figure 8.

As illustrated in more detail at Figures 6, 7 and 8 the draw-bar 1a is coupled by means of a ball joint or other universal coupling to a point preferably immediately over the centre of the back axle of the main or towing vehicle. It will be apparent that the load in the trailer is thus divided between the axle of the trailer and the chassis drawing it and by placing the coupling even forward of the back axle, all three axles can be caused to take a due proportion of the load.

The steering mechanism can be followed with the assistance of Figures 4 and 5. A steering arm 37 is hinged vertically at the centre of the base of the ball coupling. This hinging allows for vertical road oscillation of the two units. The arm 37 is connected by steering links already described. The arm 37 is arranged to remain angularly fixed in plan upon the chassis of the towing unit, and it will be clear that if the towing unit is steered say to the left the arm 37 will exert a pull upon the link 24 and through the steering mechanism described upon the link 28, causing the wheels 3, 3 to turn towards the right and to conform generally with the centre about which all six wheels are approximately turning.

The details of the coupling are shown more clearly at Figures 6, 7 and 8. The draw-bar 1a is secured to the ball and socket joint 22 in a readily detachable manner by means of the nut 49 fixing the ball 48. The socket portion 40 of the coupling is secured in a circular base 41 by means of a screwed plug 42 and trunnion arms 43 are securely fixed upon the base 41 and form journals for the forked end of the arm 37. A lower extension 44 of the base 41 is rectangular in plan and has secured to it a pair of longitudinal spindles 45 arranged to slide in suitable bearings in the ends of a member 46 which is firmly secured in the desired position over the back axle of the towing vehicle by means of a spider 22 with legs 47. It will be seen that there is thus a slight amount of longitudinal play between the members 44 and 46. The object of this is to prevent overrunning of the towing vehicle by the trailer. Any tendency of the draw-bar 1a to move towards the towing vehicle will cause the member 44 to move forward with the spindles 45, and the projection 58 will thereupon push forward the lever 59 about its pivot 59a, and will exert a pull upon the brake cable 51 which is carried over suitable guide pulleys and attached to the lever 52 upon a brake shaft whereby the brakes of the wheels 3, 3 are operated in any well-known way which it is not considered necessary to illustrate. Suitable buffers or leather pads 57 may be inserted within the ends of the member 46, and, further, a stop member as 60 may be arranged to be dropped into the clearance space to prevent the brake from operating in case it is desired to reverse the vehicle with the trailer attached.

These figures also show an arrangement of the arm 37, link 24, and steering parts 25. It is convenient to arrange for an adjustable supporting wheel at the front end of the trailer and the arrangement of this can also be seen at Figure 8, the wheel 54 being mounted in the end of a vertical tubular member 55 which is secured to the base of a screw jack 56 of which the upper end is suitably fixed so that operation of the jack mechanism raises or lowers the wheel 54: the wheel can thus be raised out of the way when the trailer is coupled or can be lowered to support the front end of the trailer in case it is desired to uncouple it from the vehicle drawing it.

It may be noted that the steering parts and the brake cable can be carried down to any desired level, and this enables a very convenient form of trailer body to be employed wherein substantially the whole floor can be less than a foot from the ground and a side ramp can be readily arranged for loading. The whole floor space will be clear and the trailer not only forms the particularly compact and convenient form of horse-box as illustrated, but is very steady on the road and makes an excellent transport unit for goods or livestock of all sorts. The weight is preferably taken only as to rather more than one-half, say two-thirds, by the trailer wheels, the remaining load coming up on the back axle of the drawing vehicle or even being distributed so as to come partly on the front axle.

The illustrated form of the invention may clearly be modified considerably within the scope of the invention as defined by the claims. For example, in one modification more particularly intended for the transportation of race horses, the construction is generally similar to that above described, but the space over the rear axle is utilized for a baggage hold, and the horses stand facing the engine. In this case, the lorry is preferably stripped of its body and the front of the trailer overhangs the rear axle of the lorry, above which it is coupled as before. The front portion of the overhang may be utilized as a passenger compartment; for example, stable boys may conveniently travel here immediately in front of the horses' heads, which may be over the rear part of the stripped chassis. This part would then be provided with a door opening upon forward hinges, so as to give complete control, as before, over the horses' heads. Various other modifications will readily suggest themselves. The springing may include coil springs balancing an uneven load, by adjustment, at the two sides of the vehicle. The vehicle can thus be used satisfactorily when loaded only upon one side of the centre, for example when carrying a single horse.

I claim:—

1. In a trailer vehicle, the combination of a low level floor, means to afford access to the floor at about the floor level, a high level main longitudinal frame from which the floor is suspended to provide a clear floor space from side to side beneath the frame, an axle arranged above the level of the floor, and means connecting the axle rigidly with the frame.

2. In a trailer vehicle, the combination of a low level floor, means to give side access to said floor at about the floor level, a high level main longitudinal frame from which the floor is suspended to provide a clear floor space from side to side beneath the frame, a rear axle arranged above the level of the floor, means connecting the axle rigidly with the frame, and a towage and suspension connection at the front of the frame.

3. A trailer comprising a rear wheel frame, a high level central frame connected to said rear wheel frame, a coupling at one end of the high level frame for connecting the latter to a towing vehicle, the coupling providing a support for one end of the high level frame, and a floor suspended from and arranged materially below the high level frame.

4. A two-wheeled trailer comprising a central high level longitudinal frame, a rigid transverse wheel-carrying frame, a floor suspended from the longitudinal frame at a materially lower level relative thereto, and a high level universal towing connection at the forward end of the longitudinal frame.

5. A trailer comprising a rear wheel frame, a high level central frame connected to said rear wheel frame, a coupling at one end of the high level frame for connecting the latter to a towing vehicle, the coupling providing a support for one end of the high level frame, and a floor suspended from and arranged materially below the high level frame, the floor providing a clear floor space transversely of the trailer.

In testimony whereof I affix my signature.

STANLEY FIELDER MOTT.